(12) United States Patent
Goodzeit et al.

(10) Patent No.: US 8,583,371 B1
(45) Date of Patent: Nov. 12, 2013

(54) AUTONOMOUS GYRO TEMPERATURE CALIBRATION

(75) Inventors: Neil E. Goodzeit, Princeton, NJ (US); Harald J. Weigl, Doylestown, PA (US)

(73) Assignee: Lockheed Martin Corporation, Bethesda, MA (US)

( * ) Notice: Subject to any disclaimer, the term of this patent is extended or adjusted under 35 U.S.C. 154(b) by 157 days.

(21) Appl. No.: 13/155,359

(22) Filed: Jun. 7, 2011

Related U.S. Application Data

(60) Provisional application No. 61/426,927, filed on Dec. 23, 2010.

(51) Int. Cl.
*G01C 21/16* (2006.01)

(52) U.S. Cl.
USPC ............... 701/501; 701/510; 701/513

(58) Field of Classification Search
USPC ................... 701/501, 510, 513
See application file for complete search history.

(56) References Cited

U.S. PATENT DOCUMENTS

| | | | | |
|---|---|---|---|---|
| 5,527,003 | A * | 6/1996 | Diesel et al. | 244/195 |
| 5,570,304 | A * | 10/1996 | Mark et al. | 703/7 |
| 6,175,807 | B1 * | 1/2001 | Buchler et al. | 701/501 |
| 6,577,929 | B2 * | 6/2003 | Johnson et al. | 701/4 |
| 6,622,091 | B2 * | 9/2003 | Perlmutter et al. | 701/472 |
| 6,732,977 | B1 | 5/2004 | Goodzeit et al. | |
| 6,859,727 | B2 * | 2/2005 | Bye et al. | 701/510 |
| 7,120,548 | B2 * | 10/2006 | Malvern et al. | 702/96 |
| 7,216,036 | B2 * | 5/2007 | Brady et al. | 701/510 |
| 7,835,826 | B1 | 11/2010 | Weigl et al. | |

OTHER PUBLICATIONS

Johnson, William et al., "Space avionics stellar-inertial subsystem", 20th Conference on Digital Avionics Systems, 2001. DASC. Date of Conference: Oct. 14-18, 2001, vol. 2, pp. 8D2/1-8D2/9 vol. 2.*
Brady, T. et al., "Ground validation of the inertial stellar compass", Proceedings of the 2004 IEEE Aerospace Conference, 2004. Date of Conference: Mar. 6-13, 2004 vol. 1, pp. 1-13.*
Denti, Eugenio et al., "An AHRS based on a Kalman filter for the integration of inertial magnetometric and GPS data", 27th Congress of International Council of the Aeronautical Sciences, Sep. 19-24, 2010, Nice, France, Paper ICAS 2010-7.2.2, 9 pages.*
Davenport, P.B. et al., "Algorithm for in-flight gyroscope calibration", Flight Mechanics/Estimation Theory Symposium, Proceedings, 1988, pp. 114-127.*
Wolf, Robert et al., "A Kalman filter for the integration of a low cost INS and an attitude GPS", Institute of Geodesy and Navigation, Munich, Germany (1997), 8 pages, published on the Internet at http://www.ifen.com/content/publications/KIS1997_GPS_INS.pdf.*

(Continued)

*Primary Examiner* — James Trammell
*Assistant Examiner* — David Testardi
(74) *Attorney, Agent, or Firm* — McDermott Will & Emery LLP

(57) ABSTRACT

The present disclosure provides systems and methods that improve the pointing accuracy of a spacecraft using temperature-sensitive gyros (e.g., MEMS gyros) by using a temperature bias model to compensate for temperature biases of the gyros and using attitude data (e.g., star tracker data) to automatically and continuously calibrate the temperature bias model over the life of the spacecraft. When star tracker data is unavailable (e.g., due to sun interference), the most recently updated temperature bias model is used in open-loop to provide improved estimation of the gyro biases and improved attitude estimation.

16 Claims, 10 Drawing Sheets

(56) References Cited

OTHER PUBLICATIONS

Northrop Grumman product brochure, "LN-120G Stellar-Inertial-GPS Navigation System", Aug. 2006, 2 pages, 24163/08-06/2000/Crawford, downloaded from http://www.es.northropgrumman.com/solutions/ln120g/assets/LN-120G_Stellar-Inertial_Navig.pdf.*

Northrop Grumman product brochure, "LN-100G Embedded GPS Inertial Navigation System", Feb. 2006, 2 pages, 22938/Feb. 6, 2000/Crawford, downloaded from http://www.sflorg.com/aviation/pdfs/pdfav031406_02_01.pdf.*

X. Li, et al., "Observability of a Geosynchronous Spacecraft Attitude Determination System," Journal of Guideance, Control, and Dynamics, Nov.-Dec. 2003, pp. 972-978, vol. 26, No. 6.

* cited by examiner

AUTONOMOUS GYRO TEMPERATURE CALIBRATION

CROSS-REFERENCE TO RELATED APPLICATION

The present application claims the benefit of priority under 35 U.S.C. §119 from U.S. Provisional Patent Application Ser. No. 61/426,927 entitled "AUTONOMOUS MEMS GYRO TEMPERATURE CALIBRATION," filed on Dec. 23, 2010, which is hereby incorporated by reference in its entirety for all purposes.

STATEMENT REGARDING FEDERALLY SPONSORED RESEARCH OR DEVELOPMENT

Not applicable.

FIELD

The present invention generally relates to gyros, and more particularly to autonomous gyro temperature calibration.

BACKGROUND

Next-generation spacecraft will use star trackers and Micro Electro-Mechanical System (MEMS) gyros for attitude determination and control. MEMS gyros are solid-state devices that are used widely in consumer products and are now being adapted for space applications. They are manufactured in large quantities using processes from the semi-conductor industry, are very small, low power, light weight, and inherently low cost. MEMS gyros may be packaged with a star tracker to create a hybrid sensor that provides both attitude and rate data. Using hybrid sensors eliminates the need for a high performance Inertial Measurement Unit (IMU) that can cost up to $3 million and weigh up to 45 lbs. The disadvantage of MEMS gyros is that they have much lower accuracy than gyros used today in precision spacecraft IMUs (e.g., 100 times or greater performance reduction). However, because star trackers can provide continuous three-axis attitude sensing, MEMS gyro data is only needed for brief periods when star tracker data is unavailable. Such data outages may occur when a star tracker is subjected to Sun interference, or is obstructed by the Earth, or during failure recovery and safe mode events.

A challenge with a MEMS based attitude determination (AD) system is getting the required pointing accuracy when the spacecraft must operate in the absence of star tracker data. As is the case with other inertial measurement devices, MEMS may have large temperature sensitivities, such that their performance varies significantly as temperature conditions change. One solution, typically employed for precision IMUs, is to actively control the MEMS gyros temperatures. However, when MEMS gyros are packaged with a star tracker, maintaining temperature control requires biasing the MEMS gyro temperatures well above the star tracker baseplate temperature. Unavoidable heat leaks with this approach increase the star tracker operating temperature and reduce star-sensing accuracy. Alternatively, the MEMS gyros temperature sensitivities can be calibrated on the ground and applied in orbit over the mission life. The drawback of this approach is that these temperature sensitivities may change significantly over the in-orbit life (typically 15 years) due to aging and radiation effects.

SUMMARY

The present disclosure provides systems and methods that improve the pointing accuracy of a spacecraft using temperature-sensitive gyros (e.g., MEMS gyros) by using a temperature bias model to compensate for temperature biases of the gyros and using attitude data (e.g., star tracker data) to automatically and continuously calibrate the temperature bias coefficient model over the life of the spacecraft. When star tracker data is unavailable (e.g., due to sun interference), the most recently updated temperature bias model is used in open-loop to provide improved estimation of the gyro biases and improved attitude estimation. When compared to systems without autonomous temperature calibration, embodiments of the present invention can reduce the pointing error for a spacecraft using MEMS gyros by a factor of seven.

In one aspect of the disclosure, an attitude determination system is provided. The attitude determination system comprises a plurality of gyros (e.g., MEMS gyros), an attitude sensor (e.g., star tracker), and a processor. The processor is configured to correct gyro rates from the gyros using a gyro temperature error model and at least one gyro temperature measurement, to generate an estimated attitude based on the corrected rates, and to automatically update the temperature model using data from the attitude sensor when the attitude sensor data is available.

In another aspect of the disclosure, a method for determining attitude is provided. The method comprises correcting gyro rates from a plurality of gyros using a temperature bias error model and at least one gyro temperature measurement, generating an estimated attitude based on the corrected rates, and automatically updating the temperature model using data from an attitude sensor when the attitude sensor data is available.

Additional features and advantages of the invention will be set forth in the description below, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

DETAILED DESCRIPTION

The present invention addresses the above limitations of the prior art by compensating for temperature sensitivities of the MEMS gyros using temperature bias coefficients of a temperature bias model and automatically and continuously calibrating the coefficients over the life of the spacecraft. The calibration may be performed by a hybrid sensor (e.g., a star tracker and MEMS gyros integrated in a single unit) or the spacecraft (for the case of separate star tracker and MEMS gyros or a hybrid sensor). According to one embodiment, when star tracker data is available, the star tracker data is used together with MEMS gyro temperature data to update the temperature bias coefficients of the temperature bias model, which can have any general functional form including linear and non-linear terms. When star tracker data is unavailable, the calibrated temperature bias model is used in open-loop to provide accurate MEMS gyro bias compensation reflective of the MEMS gyro temperature conditions. Embodiments of the present invention provide higher pointer accuracy when the MEMS gyros are used alone to determine the spacecraft attitude (e.g., when star tracker data is unavailable). Embodiments of the present invention also eliminate the need for precise temperature control. When the MEMS gyros are packaged with the star tracker, eliminating or reducing gyro temperature control requirements reduces the star tracker temperature and increases reliability and sensing accuracy.

Embodiments of the present invention are described below using the example of MEMS gyros and a star tracker. However, it is to be understood that the present invention is not limited to this example, and that other types of temperature-sensitive gyros and attitude sensors may be used with the present invention.

Figure 1:
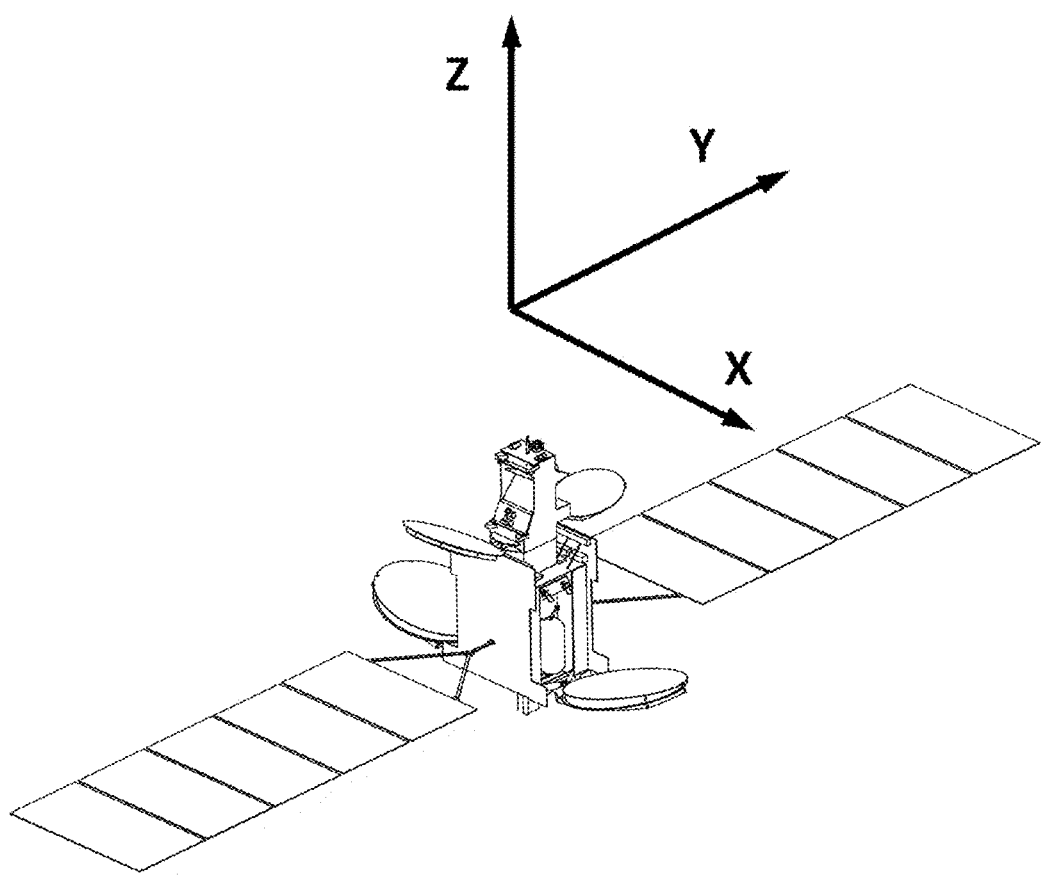
FIG. 1 shows an example of spacecraft body coordinate axes.

The spacecraft body coordinate axes definitions used in this disclosure are defined in FIG. 1. The body roll axis ($X_b$) is normal to the east face of the spacecraft shown in FIG. 1. The pitch ($Y_b$) axis is parallel to the south solar array rotation axis while the yaw ($Z_b$) axis is normal to the earth-facing spacecraft panel and completes the right-handed coordinate frame. Embodiments of the present invention improve the accuracy of the estimated orientation of the body coordinate axes relative to a reference frame based on measurements from the star tracker and MEMS gyros.

Figure 2:
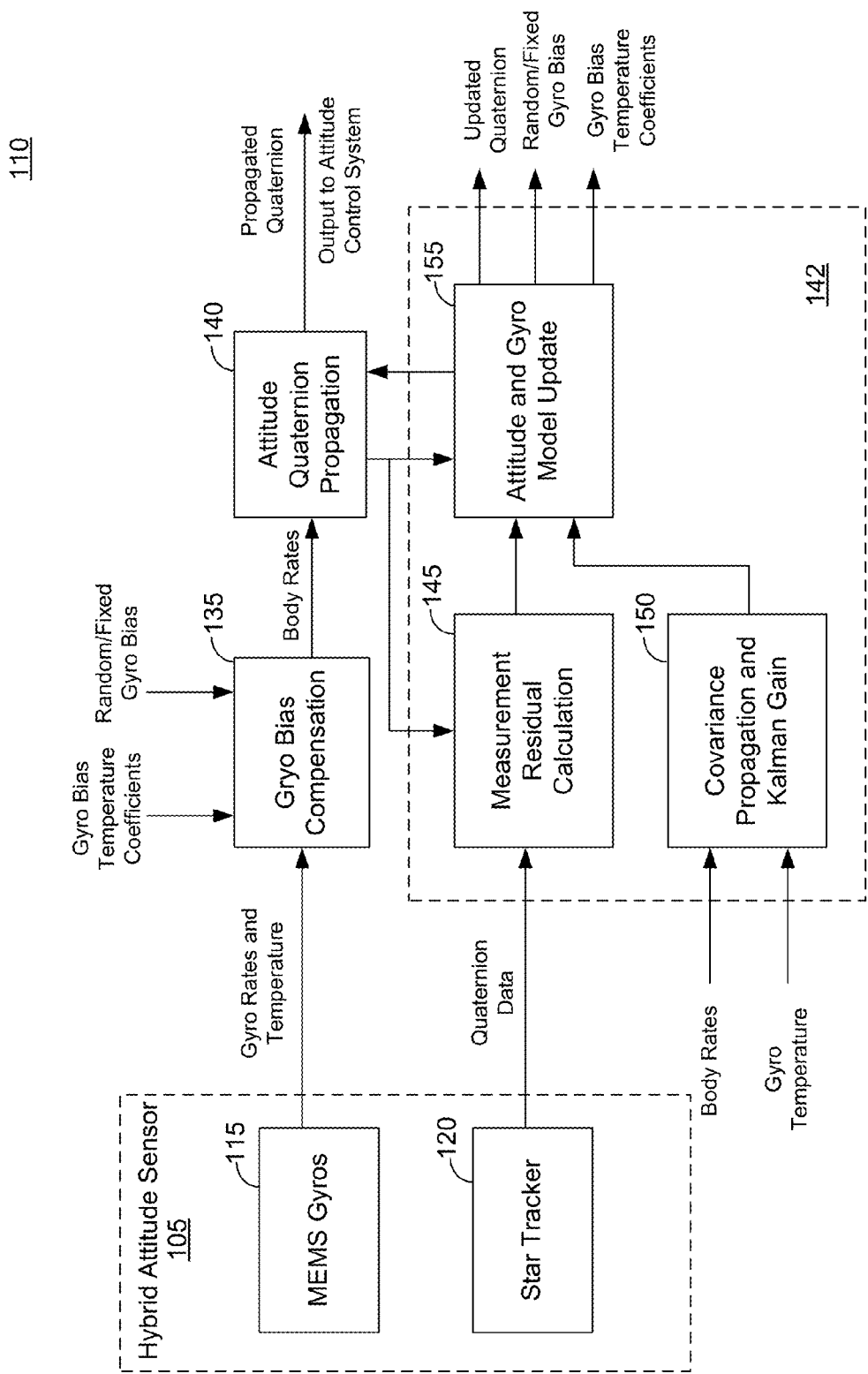
FIG. 2 is a conceptual diagram showing an attitude determination system with gyro temperature compensation according to an embodiment of the present invention.

FIG. 2 shows a module diagram of a spacecraft Attitude Determination (AD) system 110 according to an embodiment of the present invention. The AD system 110 includes attitude sensors 105 and AD logic, which may be implemented in the sensors and/or spacecraft flight software executed by an onboard computer. As shown in FIG. 2, the attitude sensors 105 may be hybrid sensors that combine a star tracker 120 with three-axis MEMS gyros 115 in a single unit. Alternatively, the MEMS gyros 115 may be packaged separately in a standalone unit, where such a standalone unit receives inputs from star tracker heads and performs processing of both the star tracker and MEMS gyro data. The AD logic includes a gyro bias compensation module 135, an attitude quaternion propagation module 140, a measurement residual calculation module 145, a covariance propagation and Kalman gain module 150, and an attitude and gyro model update module 155.

The inputs to the AD logic include quaternion data from the star tracker 120 and gyro rate data from the MEMS gyros 115. The quaternion data provides a mathematical representation of the spacecraft's attitude, as measured by the star tracker 120. The AD logic also receives MEMS gyro temperature measurements, which are used to estimate the temperature bias coefficients of the gyro bias temperature model, as discussed further below.

The gyro rate processing, which may operate at a fixed sample interval (nominally 8 Hz), proceeds as follows. The gyro bias compensation module 135 transforms the gyro rates from the MEMS gyros 115 into spacecraft body rates (i.e., angular rates with respect to the spacecraft body frame defined in FIG. 1) and corrects the body rates for fixed and random-varying bias components. Using the temperature bias coefficients and the MEMS gyro temperature measurements, the gyro bias compensation module 135 also corrects the body rates for temperature-dependent biases. Additionally, the gyro bias compensation module may correct the body rates for rate-dependent errors due to scale factor and alignment uncertainties (not shown in FIG. 2). The error-corrected body rates are then input to the attitude quaternion propagation module 140. The attitude quaternion propagation module 140 may integrate the corrected body rates to propagate the quaternion forward in time, starting from the most recently updated quaternion from the attitude and gyro model update module 155. The propagated quaternion is output to the attitude control system of the spacecraft.

When valid star tracker data is available, the AD logic updates the quaternion and the gyro bias model as follows. First, the measurement residual calculation module 145 calculates a measurement residual, which is based on the difference between the actual star tracker 120 output quaternion and the expected star tracker quaternion based on the propagated quanterion. Next, the covariance propagation and Kalman gain module 150 calculates a Kalman gain matrix based on the AD model state covariance matrix using the corrected body rates and the measured gyro temperature. A covariance matrix and Kalman gain matrix are part of a standard Kalman filter formulation. The AD dynamics model used by the AD logic, which is described in greater detail below, may include states representative of the inertial attitude error, the fixed/random bias error, and the temperature bias coefficients. Next, the attitude and gyro model update module 155 applies the Kalman gain to the measurement residual to estimate the quaternion of the spacecraft. The attitude and gyro model update module 155 also updates the AD state vector, and outputs the updated fixed/random gyro bias estimates and the temperature bias coefficients to the gyro bias compensation module 135.

When star tracker data is not available, no updates are made to the fixed/random biases or the temperature bias coefficients, so these remain constant. The gyro bias compensation module 135 uses the most recently updated coefficients to continue to correct the body rates for the bias effects of MEMS gyro temperature changes. During this time, the AD logic within the dashed line 142 is not used, and the quaternion is propagated open-loop using the corrected body rates from the gyro compensation module 135. In open-loop, the quaternion is estimated using only the body rates and the most recent quaternion estimate by the attitude and gyro model update module 155 before the star tracker became unavailable. In this way, the maximum inertial attitude accuracy is maintained under all conditions.

The use of a Kalman filter (KF) to estimate spacecraft attitude and the fixed/random gyro biases is known in the art. The implementation of a six-state prior art KF for a non-maneuvering spacecraft is summarized below. Additional details of this prior art KF can be found, for example, in "Observability of a Goesynchronous Spacecraft Attitude Determination System," X. Li and N Goodzeit, Journal of Guidance, Navigation, Control and Dynamics, Vol. 26, Number 6, 2003, which is incorporated herein by reference in its entity. Additional states may be added to estimate rate-dependent gyro errors due to scale factor and alignment uncertainties for a yaw steering spacecraft, as described in U.S. Pat. No. 7,835,826, issued on Nov. 16, 2010, which is incorporated herein by reference in its entirety.

The prior art attitude determination KF is based on a continuous-time, time-varying state space model of the attitude determination and gyro bias error dynamics. The modeled time derivative of the states is driven by random noise, $n_s(t)$, as shown in Equation 1 below:

$$\dot{x}(t)=A(t)x(t)+n_s(t) \qquad (1)$$

where x(t) is a state vector and $\dot{x}(t)$ is the derivative of the state vector. The state vector x(t) is defined in Equation 2 below:

$$x(t)=[e(t)/\omega_{bias}(t)] \qquad (2)$$

where e(t) is a three-axis AD error vector and $\omega_{bias}(t)$ is a three-axis gyro bias error. The state vector has six states, in which the first three states, e(t), are the error between the estimated and true spacecraft body three-axis attitude. The next three states, $\omega_{bias}(t)$, are the gyro bias errors which are modeled as a random walk process. This prior art gyro error model does not accurately capture temperature induced errors that may occur with MEMS gyros, nor can it be used open-loop to predict temperature bias effects. The prior art model of the attitude error time derivative is shown in Equation 3 below:

$$\dot{e}(t)=W(t)e(t)+\omega_{bias}(t)+n_1(t) \qquad (3)$$

where the derivative of e(t) depends on a skew-symmetric matrix, W(t), of the three-axis spacecraft angular body rate components. The skew-symmetric matrix, W(t), is given as follows:

$$W(t) = \begin{bmatrix} 0 & \omega_z(t) & -\omega_y(t) \\ -\omega_z(t) & 0 & \omega_x(t) \\ \omega_y(t) & -\omega_x(t) & 0 \end{bmatrix} \qquad (4)$$

Equation 5 below shows Equation 1 with the time derivatives of the six states defined above in matrix form:

$$\begin{bmatrix} \dot{e}(t) \\ \dot{\omega}_{bias}(t) \end{bmatrix} = \begin{bmatrix} W(t) & I \\ 0 & 0 \end{bmatrix} \begin{bmatrix} e(t) \\ \omega_{bias}(t) \end{bmatrix} + \begin{bmatrix} n_1(t) \\ n_2(t) \end{bmatrix} \qquad (5)$$

where I is an identity matrix. The prior art AD model in Equation 5 captures fixed and random varying gyro bias errors. In addition, MEMS gyros may exhibit measurement errors that vary linearly and non-linearly with respect to the gyro temperature and temperature time rate of change. Unmodeled temperature induced gyro biases do not corrupt the attitude estimate when star tracker data is available as shown by the simulation results discussed below. However, star tracker data will not be continuously available during spacecraft operations (e.g., when the Sun is in the tracker field of view). When star tracker data is unavailable, the spacecraft attitude is propagated open-loop based on the estimated gyro biases. Since prior art Kalman filters do not capture temperature induced errors, open-loop attitude propagation can lead to significant attitude determination errors as discussed further below.

Embodiments of the present invention significantly improve attitude estimation accuracy when no star tracker information is available by including temperature-dependent gyro biases in the AD model. Equation 6 shows a representative three-axis gyro error model that captures the bias dependence on gyro temperature, T(t):

$$\omega_{temp}(t)=C_1(t)T(t)+C_2(t)\dot{T}(t)+C_3(t)T(t)\dot{T}(t)+C_4(t)T^2(t) \qquad (6)$$

The model in Equation 6 includes time varying temperature bias coefficients, $C_1(t)$, $C_2(t)$, $C_3(t)$ and $C_4(t)$. Different temperature based terms may be used to model gyro errors as known by those skilled in the art. Some current gyro systems include a time-invariant temperature model (similar to Equation 6 but with time-invariant coefficients) where the coefficients are determined based on ground calibration testing, and are not updated over the lifetime of the spacecraft. However, MEMS gyro temperature sensitivity may vary during the spacecraft life due to aging and radiation exposure. This variation over time is captured by the model in Equation 6 by the time varying temperature bias coefficients, $C_1(t)$, $C_2(t)$, $C_3(t)$ and $C_4(t)$.

One aspect of the present invention is illustrated by the updated KF gyro error model in Equation 7 below:

$$\dot{e}(t)=W(t)e(t)+\omega_{bias}(t)+\omega_{temp}(t)+n_1(t) \qquad (7)$$

In Equation 7, the model in Equation 3 is augmented to include an estimate of temperature induced errors, $\omega_{temp}(t)$, based on the model in Equation 6. Those skilled in the art will appreciate that the invention can be extended to other temperature-dependent gyro error models. The estimated temperature induced bias errors, $\omega_{temp}(t)$, can be expressed in matrix form as shown in Equation 8:

$$\omega_{temp}(t) = \qquad (8)$$

$$T(t)c(t) = \begin{bmatrix} T(t) & \dot{T}(t) & T(t)\dot{T}(t) & T^2(t) & 0 & 0 \\ 0 & T(t) & \dot{T}(t) & T(t)\dot{T}(t) & T^2(t) & 0 \\ 0 & 0 & T(t) & \dot{T}(t) & T(t)\dot{T}(t) & T^2(t) \end{bmatrix} \begin{bmatrix} C_{x1}(t) \\ C_{x2}(t) \\ C_{x3}(t) \\ C_{x4}(t) \\ C_{y1}(t) \\ C_{y2}(t) \\ C_{y3}(t) \\ C_{y4}(t) \\ C_{z1}(t) \\ C_{z2}(t) \\ C_{z3}(t) \\ C_{z4}(t) \end{bmatrix}$$

Embodiments of the present invention incorporate the temperature-dependent gyro error model in Equations 7 and 8 into the AD model by augmenting the state vector with estimates of the temperature bias coefficients. In accordance with one aspect of the present invention, this adds 12 coefficients (shown in Equation 8) to the state vector as shown in Equation 9 below:

$$\begin{bmatrix} \dot{e}(t) \\ \dot{\omega}_{bias}(t) \\ \dot{c}(t) \end{bmatrix} = \begin{bmatrix} W(t) & I & T(t) \\ 0 & 0 & 0 \\ 0 & 0 & 0 \end{bmatrix} \begin{bmatrix} e(t) \\ \omega_{bias}(t) \\ c(t) \end{bmatrix} + \begin{bmatrix} n_1(t) \\ n_2(t) \\ n_3(t) \end{bmatrix} \qquad (9)$$

The temperature measurement matrix, T(t), from Equation 8 is based on the measured gyro temperature that is input to the AD logic as shown in FIG. 1. The temperature bias coefficients may be modeled by a random walk process which allows the system to track variations in the gyro temperature sensitivity over time.

The AD logic of FIG. 2 may implement a Kalman filter that is formulated based on the model in Equation 9 to update the temperature bias coefficients using star tracker data when star tracker is available. The updated temperature bias coefficients are feed to the gyro bias compensation module 135, which uses the updated coefficients and the gyro temperature measurement to correct the body rates for temperature-dependent biases of the MEMS gyros 115. When star tracker data is not available, the gyro bias compensation module 135 may use the most recently updated coefficients in open-loop to correct the body rates for temperature-dependent biases.

Simulation results will now be discussed illustrating how the augmented model in Equation 9 allows the AD system to accurately estimate the attitude error, fixed and random-varying gyro biases and temperature induced gyro biases while star tracker data is available. For the simulated operational scenario, the invention improves the accuracy of open-loop attitude propagation by a factor of 7 when no star tracker data is available.

The simulation results in FIGS. 3 to 6 show AD system performance with a prior art KF based on the model in Equation 5. Improved performance using an embodiment of the invention with the temperature bias coefficient estimates (augmented model in Equation 9) is illustrated by the results in FIGS. 7 to 10. The simulation shows performance during geosynchronous transfer orbit operations when the Sun may periodically pass through the star tracker field of view. In the simulation, the spacecraft rotates about the yaw (Zb) axis at 0.6°/sec (10 minute rotation period). Using a bias temperature model, the temperature induced errors are modeled as the gyros pass in and out of the Sun during each rotation. For all simulations, star tracker data is used to update the KF states during the first 180 minutes. After 180 minutes, two spacecraft yaw rotations without tracker data are simulated to illustrate the improved attitude estimation accuracy using the invention.

Figure 3:
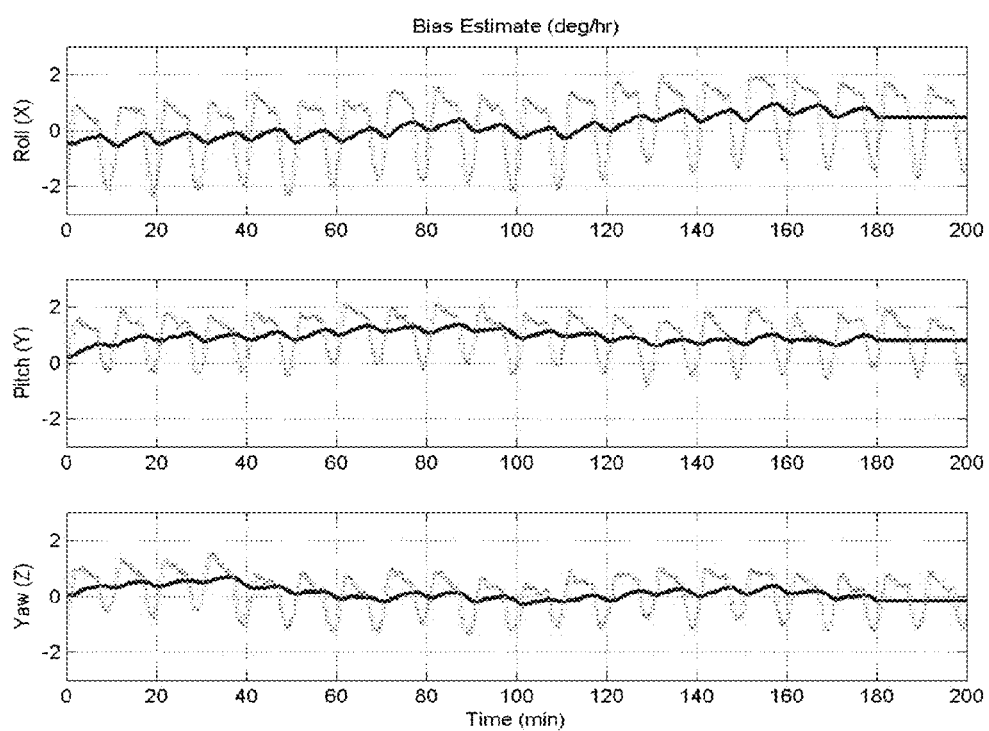
FIG. 3 is a plot showing gyro bias estimate for a prior art system.
Figure 4:
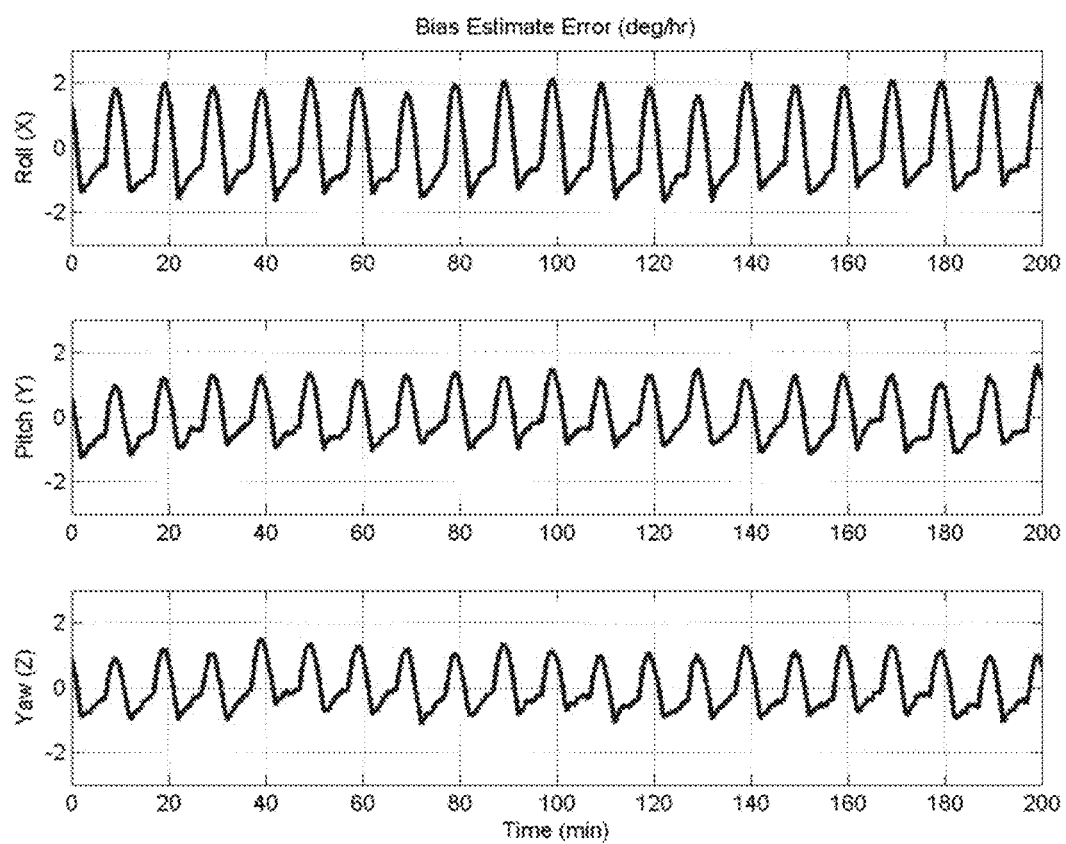
FIG. 4 is a plot showing gyro bias estimation error for the prior art system.
Figure 5:
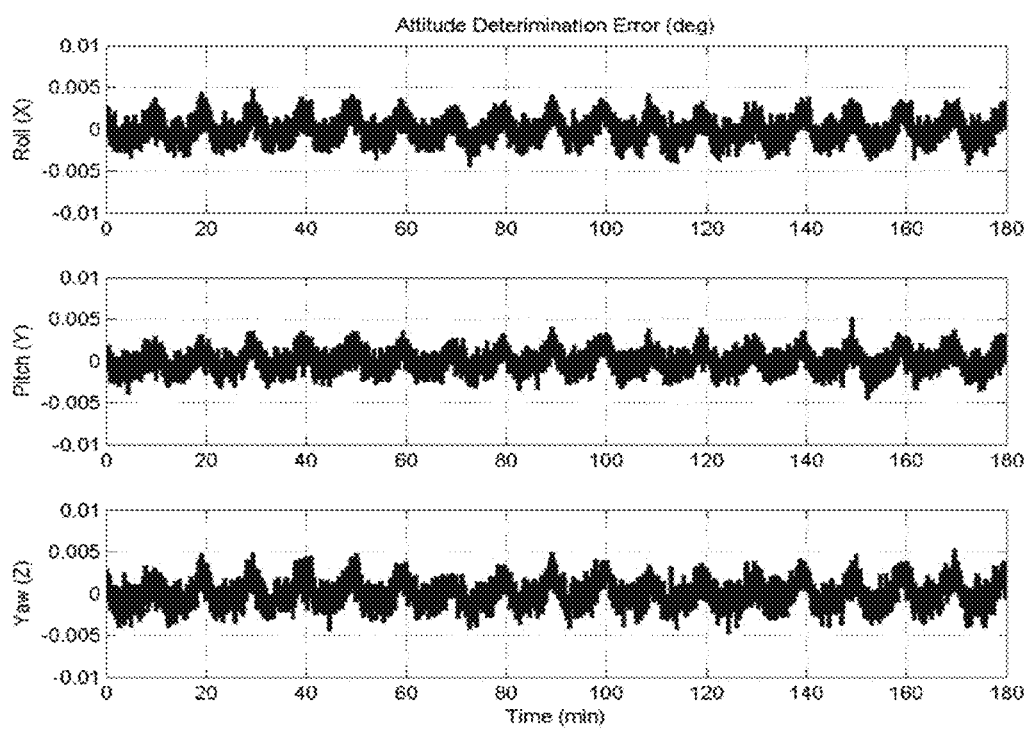
FIG. 5 is a plot showing attitude estimation error with star tracker data for the prior art system.
Figure 6:
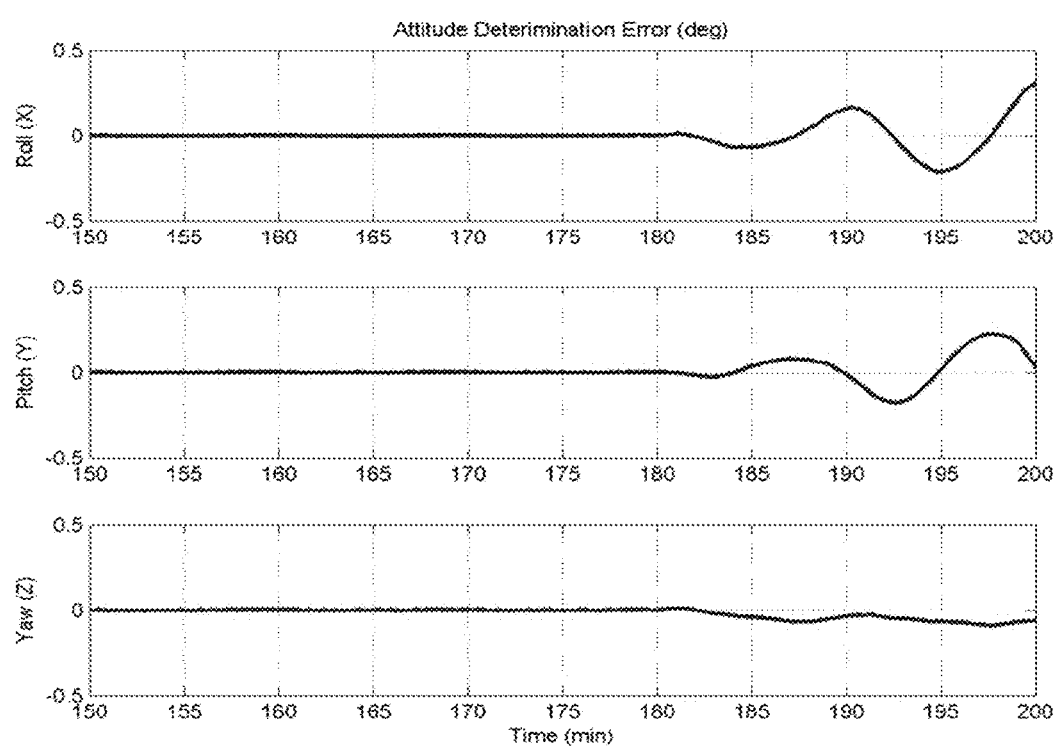
FIG. 6 is a plot showing attitude estimation error without star tracker data for the prior art system.

The dashed lines in FIG. 3 show the total modeled gyro errors which include fixed, random and temperature induced bias. The solid line shows the estimated gyro bias using the prior art model in Equation 5. The estimated gyro bias captures the slowly varying component of the errors while the star tracker data is available up to 180 minutes. The prior art KF does not capture the non-linear effects induced by the periodic temperature variations. As shown, the estimated gyro bias is not updated after 180 minutes. FIG. 4 shows the large errors between the true and estimated gyro bias due to the temperature induced errors. As shown in FIG. 5, the attitude determination errors are below 0.005° during the first 180 minutes when the KF states are updated using star tracker measurements. FIG. 6 shows that the attitude estimation errors grow to 0.36° between 180 and 200 minutes when the star tracker data is unavailable. This significant error occurs because the temperature induced gyro errors are not modeled by the prior art AD system.

Figure 7:
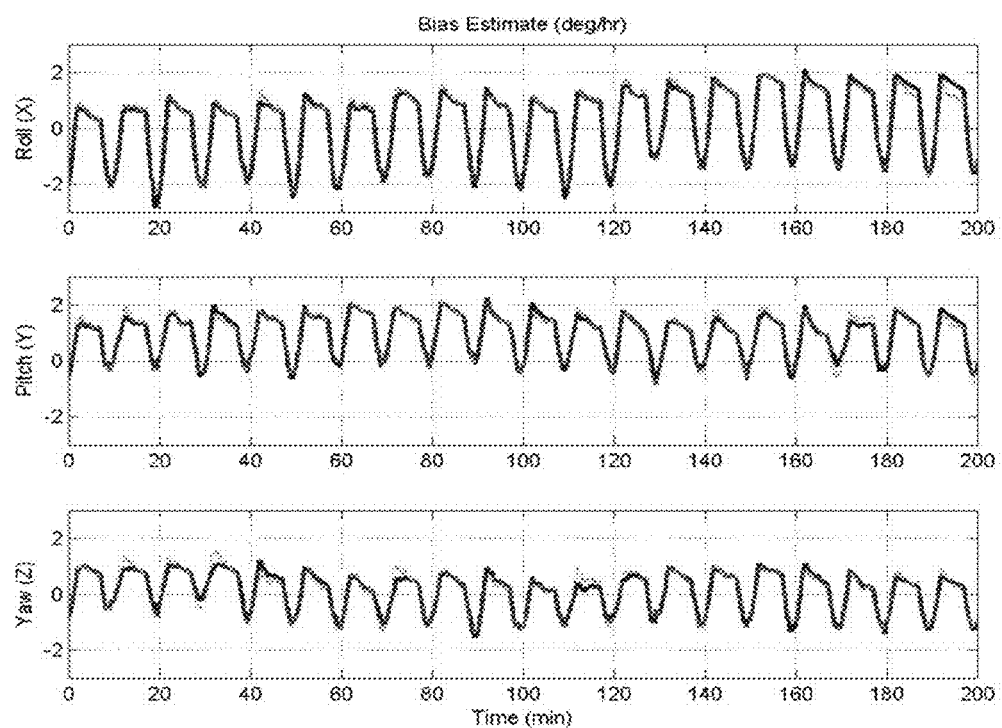
FIG. 7 is a plot showing improved gyro bias estimate according to an embodiment of the present invention.
Figure 8:
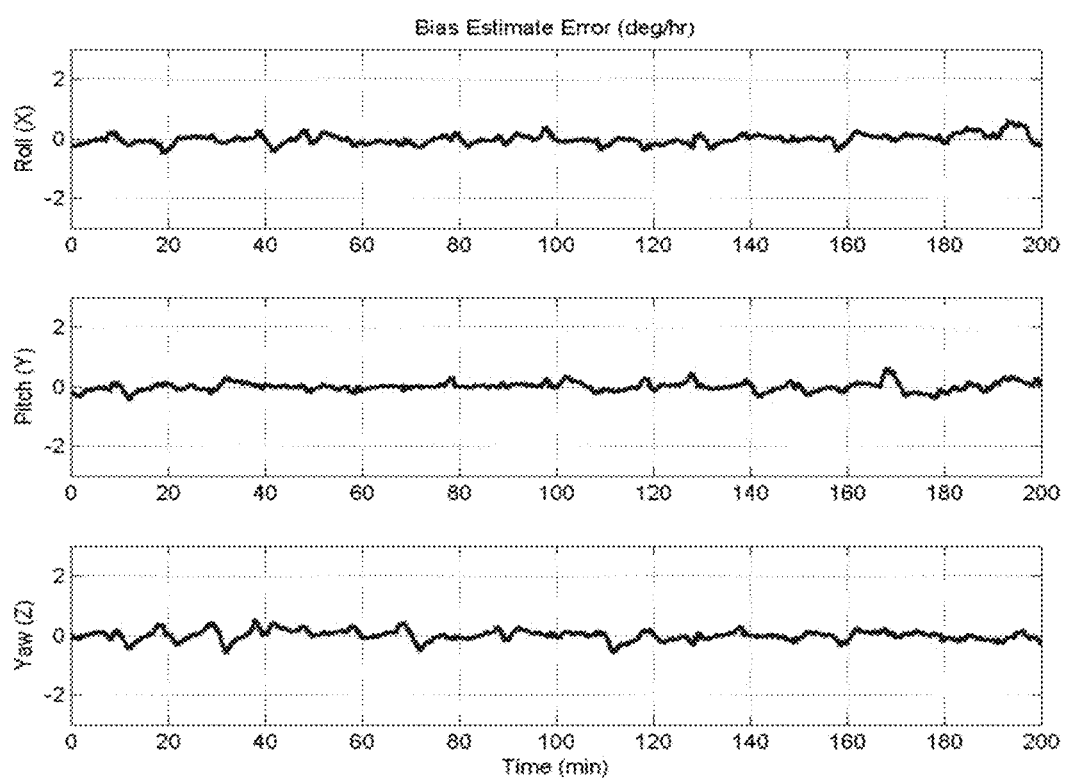
FIG. 8 is a plot showing improved gyro bias estimation error according to an embodiment of the present invention.
Figure 9:
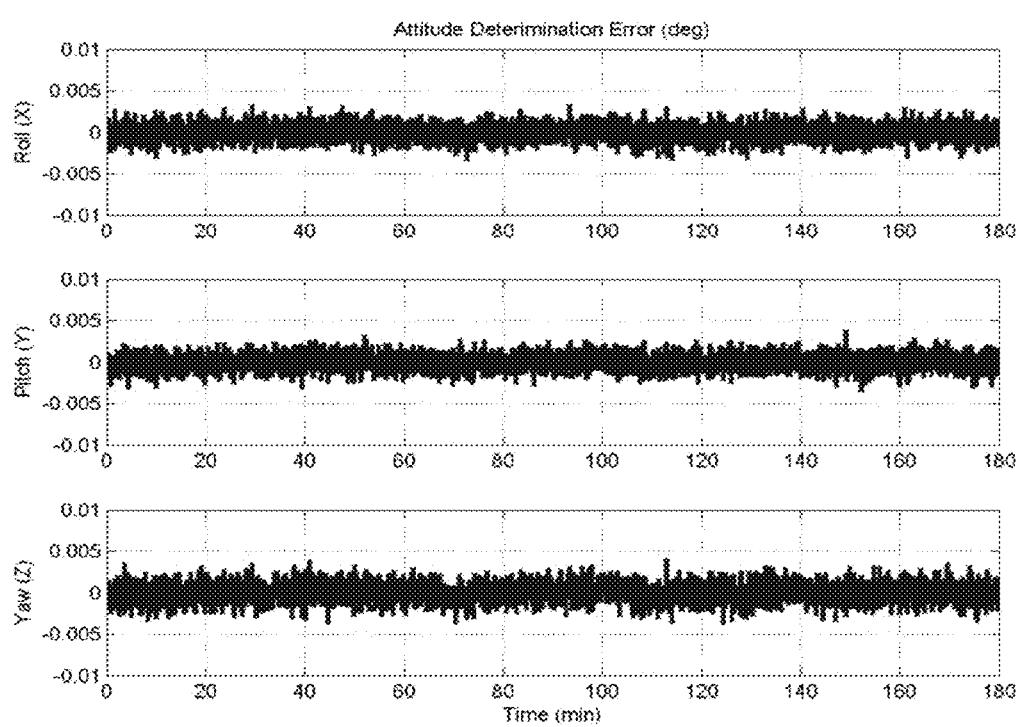
FIG. 9 is a plot showing improved attitude estimation error with star tracker data according to an embodiment of the present invention.
Figure 10:
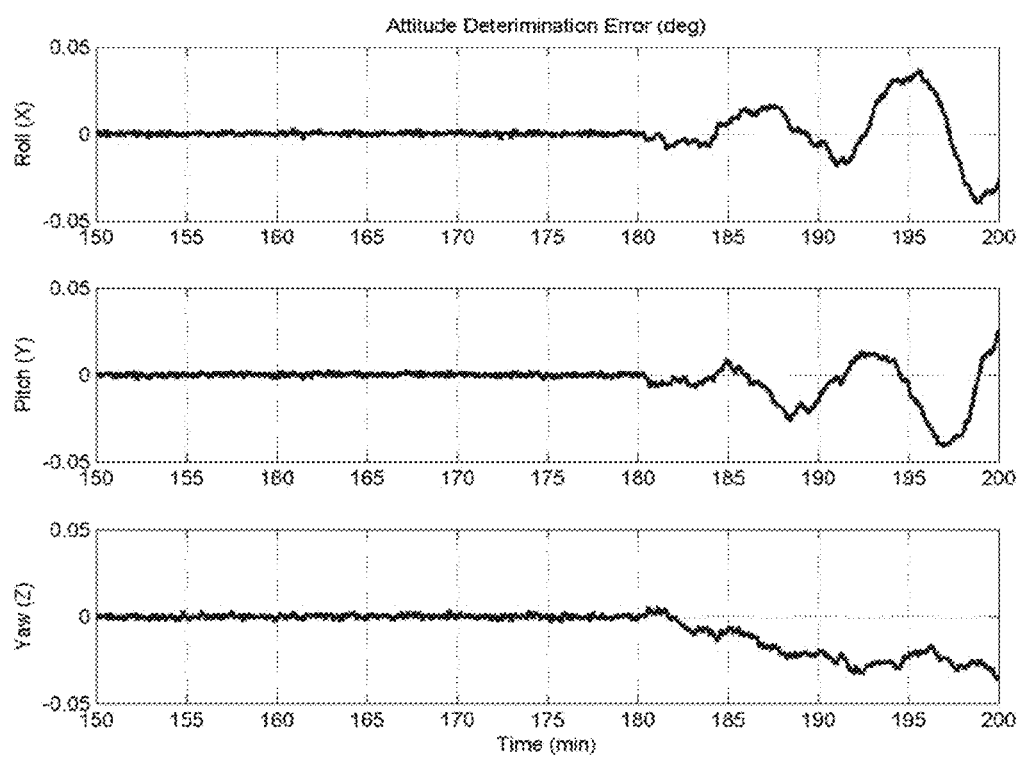
FIG. 10 is a plot showing improved attitude estimation error without star tracker data according to an embodiment of the present invention.

FIG. 7 shows the improved gyro bias estimate using an embodiment of the invention. As shown, the model in Equation 9 accurately captures the fixed, random and temperature bias errors. This is also illustrated by the small residual gyro bias estimation error in FIG. 8. During the last two spacecraft rotations without tracker data, a small gyro bias estimation error is present which is much smaller than the estimate using the prior art KF in FIG. 4. The attitude estimation errors in FIG. 9 are comparable to the prior art KF when the star tracker data is available. The advantage of the present invention is illustrated by the much smaller attitude estimation errors that occur after 180 minutes when the attitude is propagated open-loop without tracker data, as shown in FIG. 10. In this case, the maximum attitude error is less than 0.05° compared to the prior art estimation error of 0.36°.

The description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, 6th paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. An attitude determination system, comprising:
a plurality of gyros;
an attitude sensor; and
a processor configured to correct gyro rates from the gyros using a gyro temperature error model and at least one gyro temperature measurement, to generate an estimated attitude based on the corrected gyro rates, and to automatically update the gyro temperature error model using data from the attitude sensor when the attitude sensor data is available and using a Kalman filter having a plurality of states including states corresponding to time varying temperature bias coefficients of the gyro temperature error model, wherein the Kalman filter is based on the following model:

$$\begin{bmatrix} \dot{e}(t) \\ \dot{\omega}_{bias}(t) \\ \dot{c}(t) \end{bmatrix} = \begin{bmatrix} W(t) & I & T(t) \\ 0 & 0 & 0 \\ 0 & 0 & 0 \end{bmatrix} \begin{bmatrix} e(t) \\ \omega_{bias}(t) \\ c(t) \end{bmatrix} + \begin{bmatrix} n_1(t) \\ n_2(t) \\ n_3(t) \end{bmatrix}$$

where e(t) is an attitude error vector, $\omega_{bias}(t)$ is a gyro bias error vector, c(t) is a temperature bias vector, W(t) is a skew-symmetric matrix, I is an identity matrix, T(t) is a temperature measurement matrix, and $n_1(t)$, $n_2(t)$ and $n_3(t)$ are noise functions.

2. The attitude determination system of claim 1, wherein the plurality of gyros comprise Micro Electro-Mechanical System (MEMS) gyros.

3. The attitude determination system of claim 2, wherein the attitude sensor comprises a star tracker.

4. The attitude determination system of claim 3, wherein the MEMS gyros and the star tracker are packaged together in a single unit.

5. The attitude determination system of claim 1, wherein, when the attitude sensor data is unavailable, the processor is configured to generate the estimated attitude in open-loop using the most recently updated gyro temperature error model to correct the gyro rates.

6. The attitude determination system of claim 1, wherein the plurality of states include states representative of inertial attitude error and fixed/random bias error.

7. The attitude determination system of claim 1, wherein the processor is configured to correct the gyro rates based on the following temperature-dependent error model:

$$\omega_{temp}(t) = C_1(t)T(t) + C_2(t)\dot{T}(t) + C_3(t)T(t)\dot{T}(t) + C_4(t)T^2(t)$$

where $\omega_{temp}(t)$ is temperature bias error, T(t) is the gyro temperature measurement, and $C_1(t)$, $C_2(t)$, $C_3(t)$ and $C_4(t)$ are the time varying temperature bias coefficients of the gyro temperature error model.

8. A method for determining attitude, comprising:
correcting gyro rates from a plurality of gyros based on the following gyro temperature error model:

$$\omega_{temp}(t) = C_1(t)T(t) + C_2(t)\dot{T}(t) + C_3(t)T(t)\dot{T}(t) + C_4(t)T^2(t)$$

where $\omega_{temp}(t)$ is temperature bias error, T(t) is a gyro temperature measurement, and $C_1(t)$, $C_2(t)$, $C_3(t)$ and $C_4(t)$ are temperature bias coefficients of the gyro temperature error model;
generating an estimated attitude based on the corrected gyro rates; and
automatically updating, by a processor, the gyro temperature error model using data from an attitude sensor when the attitude sensor data is available and using a Kalman filter having a plurality of states including states corresponding to the temperature bias coefficients of the gyro temperature error model.

9. The method of claim 8, wherein the plurality of gyros comprise Micro Electro-Mechanical System (MEMS) gyros.

10. The method of claim 9, wherein the attitude sensor comprises a star tracker.

11. The method of claim 10, wherein the MEMS gyros and the star tracker are packaged together in a single unit.

12. The method of claim 8, further comprising, when the attitude sensor data is unavailable, generating the estimated attitude in open-loop using the most recently updated gyro temperature error model to correct the gyro rates.

13. The method of claim 8, wherein the temperature bias coefficients of the gyro temperature error model comprise time varying temperature bias coefficients.

14. The method of claim 8, wherein the plurality of states include states representative of inertial attitude error and fixed/random bias error.

15. The method of claim 8, wherein the Kalman filter is based on the following model:

$$\begin{bmatrix} \dot{e}(t) \\ \dot{\omega}_{bias}(t) \\ \dot{c}(t) \end{bmatrix} = \begin{bmatrix} W(t) & I & T(t) \\ 0 & 0 & 0 \\ 0 & 0 & 0 \end{bmatrix} \begin{bmatrix} e(t) \\ \omega_{bias}(t) \\ c(t) \end{bmatrix} + \begin{bmatrix} n_1(t) \\ n_2(t) \\ n_3(t) \end{bmatrix}$$

where e(t) is an attitude error vector, $\omega_{bias}(t)$ is a gyro bias error vector, c(t) is a temperature bias vector, W(t) is a skew-symmetric matrix, I is an identity matrix, T(t) is a temperature measurement matrix, and $n_1(t)$, $n_2(t)$ and $n_3(t)$ are noise functions.

16. A non-transitory machine readable medium embodying instructions that, when executed by a machine, cause the machine to perform a method for determining attitude, the method comprising:
correcting gyro rates from a plurality of gyros using a gyro temperature error model and at least one gyro temperature measurement;
generating an estimated attitude based on the corrected gyro rates; and
updating the gyro temperature error model using data from an attitude sensor when the attitude sensor data is available, wherein either:
(a) the gyro temperature error model comprises:

$$\omega_{temp}(t) = C_1(t)T(t) + C_2(t)\dot{T}(t) + C_3(t)T(t)\dot{T}(t) + C_4(t)T^2(t)$$

where $\omega_{temp}(t)$ is temperature bias error, T(t) is the gyro temperature measurement, and $C_1(t)$, $C_2(t)$, $C_3(t)$ and $C_4(t)$ are temperature bias coefficients of the gyro temperature error model; or
(b) the gyro temperature error model is updated using a Kalman filter is based on the following model:

$$\begin{bmatrix} \dot{e}(t) \\ \dot{\omega}_{bias}(t) \\ \dot{c}(t) \end{bmatrix} = \begin{bmatrix} W(t) & I & T(t) \\ 0 & 0 & 0 \\ 0 & 0 & 0 \end{bmatrix} \begin{bmatrix} e(t) \\ \omega_{bias}(t) \\ c(t) \end{bmatrix} + \begin{bmatrix} n_1(t) \\ n_2(t) \\ n_3(t) \end{bmatrix}$$

where e(t) is an attitude error vector, $\omega_{bias}(t)$ is a gyro bias error vector, c(t) is a temperature bias vector, W(t) is a skew-symmetric matrix, I is an identity matrix, T(t) is a temperature measurement matrix, and $n_1(t)$, $n_2(t)$ and $n_3(t)$ are noise functions.

* * * * *